(12) United States Patent
Zaneboni

(10) Patent No.: US 12,466,562 B2
(45) Date of Patent: Nov. 11, 2025

(54) AIRCRAFT COCKPIT SEAT WITH DISPLAY INTEGRATED INTO THE REAR OF THE SEAT BACK, AND COCKPIT PROVIDED WITH SUCH A SEAT

(71) Applicant: Airbus (S.A.S.), Blagnac (FR)

(72) Inventor: Jason Zaneboni, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 18/521,335

(22) Filed: Nov. 28, 2023

(65) Prior Publication Data

US 2024/0174363 A1 May 30, 2024

(30) Foreign Application Priority Data

Nov. 29, 2022 (FR) ...................................... 2212514

(51) Int. Cl.
*B64D 11/00* (2006.01)
*B64D 11/06* (2006.01)

(52) U.S. Cl.
CPC .... *B64D 11/00155* (2014.12); *B64D 11/0689* (2013.01)

(58) Field of Classification Search
CPC ...................... B64D 11/00155; B64D 11/0689
See application file for complete search history.

(56) References Cited

U.S. PATENT DOCUMENTS

| 4,204,255 A * | 5/1980 | Cremer | B60N 2/02246 |
| | | | 296/65.09 |
| 6,663,010 B2 * | 12/2003 | Chene | G05D 23/1905 |
| | | | 236/51 |
| 7,678,041 B2 * | 3/2010 | Prenzel | B64D 11/0607 |
| | | | 600/9 |
| 7,862,112 B2 * | 1/2011 | Caturla | B60R 11/0235 |
| | | | 297/188.06 |
| 8,276,845 B2 | 10/2012 | Orgerie | |
| 8,701,953 B2 * | 4/2014 | Bopp | B64D 45/00 |
| | | | 224/547 |
| 9,731,823 B2 * | 8/2017 | Guering | B64D 11/00 |
| 10,017,139 B2 * | 7/2018 | Brenner | B60R 16/037 |
| 10,742,625 B2 * | 8/2020 | Watson | H04L 63/0428 |
| 11,044,177 B2 * | 6/2021 | Watson | H04L 67/12 |
| 11,993,363 B2 * | 5/2024 | Hall | B64D 11/0689 |

(Continued)

FOREIGN PATENT DOCUMENTS

| WO | WO-2008154311 A2 * | 12/2018 | ......... B60R 11/0235 |
| WO | WO-2024015807 A1 * | 1/2024 | ............ B60N 2/005 |

OTHER PUBLICATIONS

WO 2024015807 A1 (Year: 2024).*
French Search Report for Application No. 2212514 dated May 17, 2023.

*Primary Examiner* — Brian M O'Hara
(74) *Attorney, Agent, or Firm* — KDW Firm PLLC

(57) ABSTRACT

A cockpit seat comprising a seat back having a rear face and a cushion, wherein the seat back has equipment integrated into the rear face of the seat back and having at least one comfort parameter control and a display zone. Thus, the comfort parameter controls are easily visible and accessible on entering the cockpit, and the person entering can directly adapt his or her environment according to his or her wishes. A cockpit provided with such a seat and a method for controlling a comfort parameter from such a seat are disclosed.

10 Claims, 5 Drawing Sheets

(56) References Cited

U.S. PATENT DOCUMENTS

| | | |
|---|---|---|
| 2009/0008969 A1 | 1/2009 | Caturla |
| 2011/0266392 A1 | 11/2011 | Goehlich |
| 2012/0139303 A1 | 6/2012 | Westerink |
| 2013/0160768 A1 | 6/2013 | Guering |
| 2019/0185165 A1 | 6/2019 | Guering |
| 2019/0375514 A1* | 12/2019 | Lampazzi ................ G09G 5/38 |
| 2024/0017829 A1* | 1/2024 | Ha ................... B64D 11/00152 |

* cited by examiner

AIRCRAFT COCKPIT SEAT WITH DISPLAY INTEGRATED INTO THE REAR OF THE SEAT BACK, AND COCKPIT PROVIDED WITH SUCH A SEAT

TECHNICAL FIELD

The disclosure herein relates to aircraft cockpits and more particularly to aircraft cockpit seats.

BACKGROUND

Conventionally, an aircraft cockpit comprises controls referred to as piloting controls necessary for piloting the aircraft that are distributed over an instrument panel extending transversely to the aircraft. Controls referred to as comfort controls for allowing a pilot to control comfort parameters in the cockpit, such as, for example, the temperature, can also be found on the instrument panel or on the center pedestal. Thus, when the pilot enters the cockpit, these comfort controls are not easily and rapidly accessible given that they are incorporated in the instrument panel or center pedestal along with the piloting controls.

SUMMARY

The subject matter herein discloses a new control interface for controlling these comfort parameters.

To this end, the disclosure herein relates to a cockpit seat comprising a seat back having a rear face and a cushion, wherein the seat back has equipment integrated into the rear face of the seat back and having at least one comfort parameter control and a display zone.

Thus, the comfort parameter controls are easily visible and accessible on entering the cockpit, and the person entering can directly adapt his or her environment according to his or her wishes.

The disclosure herein provides at least one of the following optional features, taken individually or in combination.

The equipment comprises a removable part having at least some of the controls, at least one processor and at least one storage zone.

The equipment comprises a touchscreen, controls being actuated by simply pressing on the screen.

The seat back comprises a headrest, and the equipment is integrated into the headrest at least in part.

The seat back comprises a shell, the rear face of the seat back then corresponding to the rear face of the shell, and the equipment being integrated into the upper part of the shell on a face that is inclined with respect to the horizontal.

The disclosure herein also relates to a cockpit provided with a seat having one or more of the features presented above, wherein it comprises an instrument panel having piloting controls segregated from comfort controls accessible from the equipment integrated into the rear face of at least one cockpit seat.

The disclosure herein also relates to a method for controlling comfort parameters of a cockpit, wherein at least part of the control is carried out using comfort controls belonging to equipment integrated into a rear face of at least one seat of the cockpit, the equipment having a display zone.

The disclosure herein provides at least one of the following optional features, taken individually or in combination.

The method comprises controlling the display zone to provide temporary, alternative or complementary lighting of the cockpit.

Certain comfort controls are accessible from the equipment and also at a distance therefrom in the cockpit outside the instrument panel.

The equipment activates comfort controls associated with control parameters determined according to the user identified by recognition features of the equipment.

BRIEF DESCRIPTION OF THE DRAWINGS

Other aims, features and advantages will become apparent from the following description of the disclosure herein, which description is given by way of solely non-limiting example, with reference to the accompanying drawings below.

DETAILED DESCRIPTION

Figure 1:
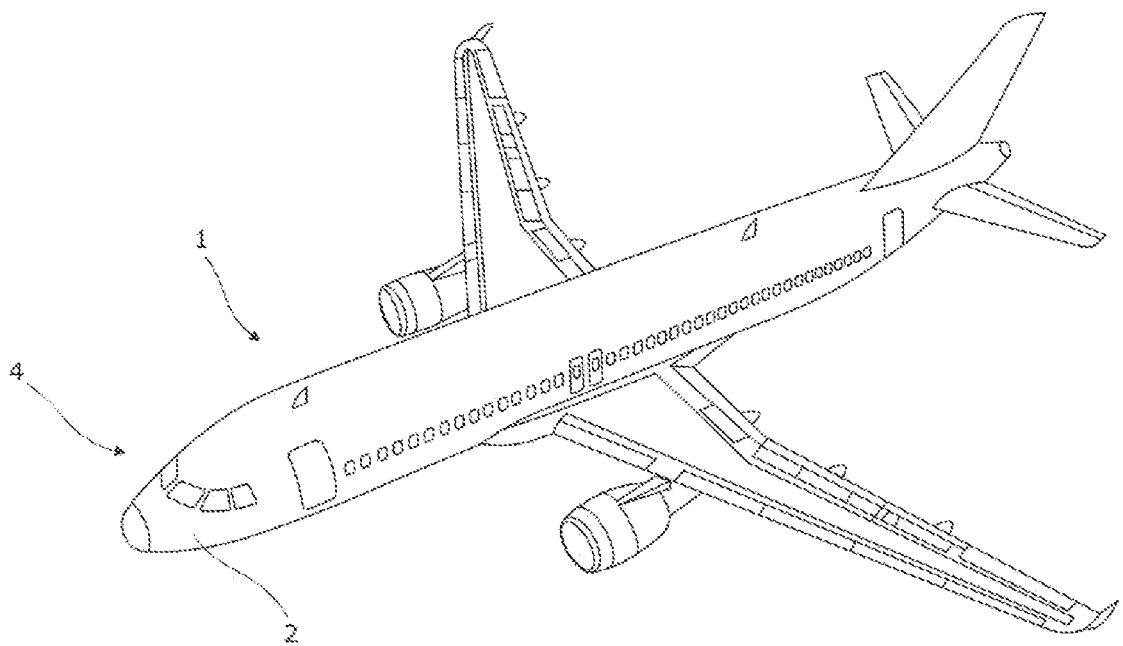
FIG. 1 is a perspective view of an aircraft provided with at least one seat according to the disclosure herein.
Figure 2:
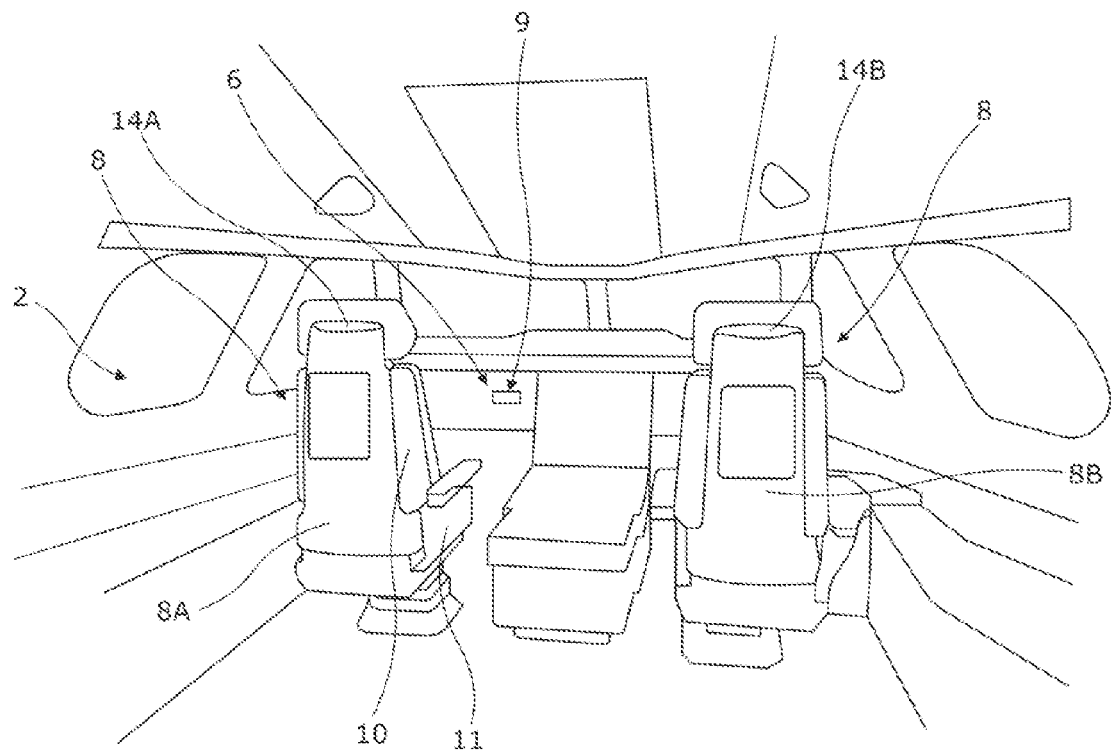
FIG. 2 is a perspective view of a cockpit provided with two seats according to the disclosure herein seen from inside an aircraft and from the rear of the cockpit.
Figure 3:
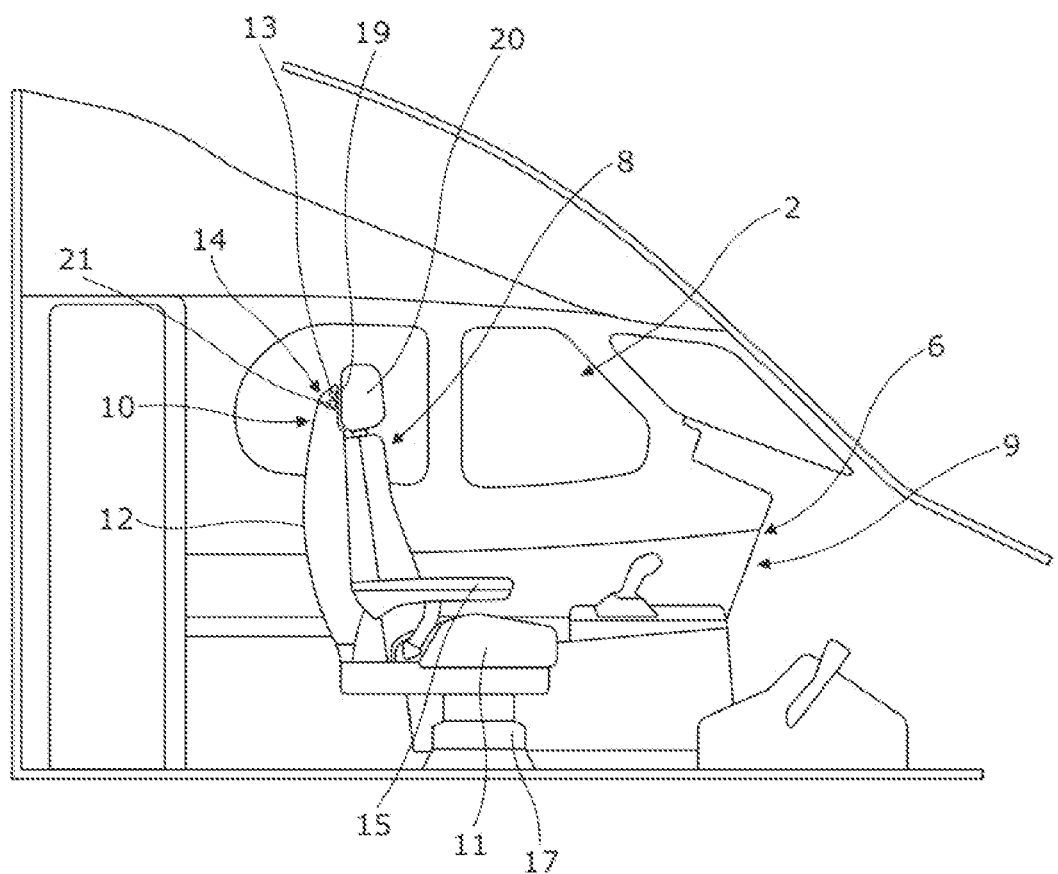
FIG. 3 is a schematic side view of a cockpit provided with a seat according to the disclosure herein.

FIG. 1 shows an aircraft 1 having a cockpit 2, also called a flight deck, in a nose cone 4. The cockpit 2 has an instrument panel 6 (for simplification purposes, the center pedestal is considered to form part of the instrument panel) and at least one adjustable seat 8 to allow a pilot and/or a co-pilot to adjust his or her seat in order to access the piloting controls 9 situated on the instrument panel 6 and to see the external environment in a suitable manner. In the embodiment illustrated in FIG. 2, two seats 8, respectively designated by the references 8A, 8B, are provided in the cockpit. Only one piloting control 9 is shown on the instrument panel 6 to simplify the drawing, here in the form of a push-button.

The cockpit seat 8 (in the embodiment illustrated in FIG. 2, the seats 8A and 8B) conventionally comprises a seat back 10 and a cushion 11. The seat back according to certain embodiments comprises a headrest 20: the headrest 20 is considered to form an integral part of the seat back. The seat also has armrests 15 and a support base 17. As shown in FIGS. 3 to 6, the seat back of the seat 8 incorporates equipment 14 at its rear face 12. The equipment 14 takes the form of an electronic device 13 having at least one processor 19 for processing data and at least one data storage zone 21 in the form, for example, of an electronic memory. The electronic device 13 will not be described in more detail since it is of known type. The equipment 14 also comprises a display zone 16. The display zone 16 may comprise liquid crystals, plasma, light-emitting diodes (LEDs) or the like. The display zone must be arranged at a level such that when the pilot enters the cockpit 2, the display is clearly visible to the pilot. Thus, in the illustrated embodiments, the display zone 16 is arranged at the upper part 18 of the seat back 10. The upper part is considered to be the part situated vertically above the armrests 15. In the embodiments of FIGS. 3 to 6, the display zone 16 is situated at the headrest 20 and may extend slightly below as in the embodiment of FIG. 6. In the embodiment of FIGS. 3 to 6, the seat 8 comprises an additional shell 22: the rear face 12 of the seat then comprises a rear face 12A of the shell 22. The shell 22 extends from the lower part 24 of the seat (the lower part corresponding to the part situated below the armrests) up to the headrest 20 and, in the illustrated embodiment, more precisely, at the median part 26 of the headrest 20. The median part 26 of the headrest corresponds to a central strip extending over 80% of the height of the headrest. The height is considered in the vertical direction when the aircraft is resting on the ground.

The equipment 14 comprises controls 28 for controlling comfort parameters, referred to as comfort controls 28. The comfort controls 28 make it possible to adjust comfort parameters for improving or adapting the environment to the wishes of the persons occupying the cockpit, such as the pilot, the co-pilot or the flight engineer. The comfort parameters designate any parameter of the piloting environment, such as the adjustment of the seat (height, depth, tilt, position of the headrest and of the seat base, if made possible by the configuration, etc.), the brightness of the lighting in the cockpit, and the display of different information associated with the piloting, such as welcome information for the members of the cockpit. Certain parameters are specific to certain flight phases. When the persons entering access the interior of the cockpit, the accessible parameters are those making it possible to adapt the piloting environment for starting a flight. Once in flight, information destined for the pilots can be displayed, such as the position of the cabin crew in the aircraft. The comfort controls 28 are situated at a distance from the piloting controls 9 and are clearly distinct. The pilot knows that, by manipulating the equipment 14, he or she will act only on the comfort parameters and will not be liable to interfere with the piloting, which reinforces the safety in the manipulation of the comfort controls. In the case of a pilot being situated at the piloting controls 9 and a co-pilot at the comfort controls 28, it will not be possible for there to be any contradictory controls. One of them can modify the comfort parameters while the other performs the piloting. One of them can even adapt a comfort parameter such as the position of the seat of the other so that he or she can concentrate on the piloting. It is also possible that the pilot and the co-pilot perform the piloting and that in parallel a member of the crew will adjust the comfort parameters. The positioning of the comfort controls 28 on the cockpit seat 8 at a distance from the piloting controls 9 makes it possible to physically segregate them: the piloting controls 9 are physically accessible from the instrument panel 6 and the comfort controls 28 are physically accessible from the equipment 14. When the pilot enters the cockpit 2, he or she has no need to sit down on his or her seat 8 in order to access the comfort controls 28. Once in the cockpit, he or she has direct and rapid access to the equipment 14. Moreover, he or she can carry out the adjustment while standing, which makes the programming of the parameters more pleasant. When having barely entered the cockpit, he or she can adjust the comfort parameters of his or her piloting compartment.

In the illustrated embodiments, the equipment 14 has a touchscreen which can have some or all of the display zone 16. Thus, certain controls 28 or even all of them are zones of the screen 30 on which a pressing movement triggers an action which can be of varied type: the action can be the direct control of a component such as the control of the height of the seat. It can also be, for example, the request to enter data for adjusting the comfort parameter in question before passing to the control itself. Controls can also take the form of a push-button or any other form.

The equipment 14 can take numerous forms. In the embodiments illustrated in FIGS. 4 to 6, the equipment is integrated into the upper part 23 of the shell 22. As for the seat back, the upper part 23 of the shell 22 is considered to be the part of the shell situated above the armrests 15.

Figure 4:
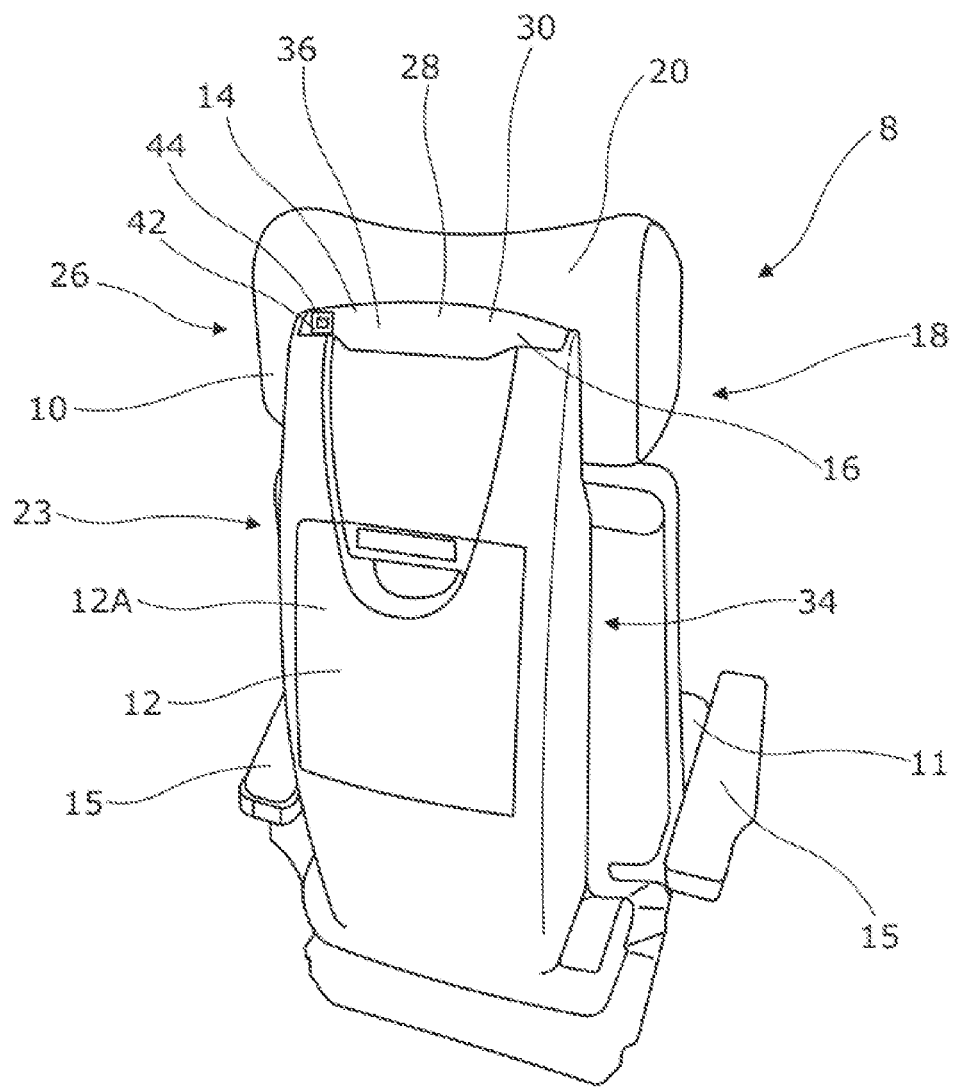
FIG. 4 is a partial perspective view of a seat seen from the rear according to the schematic embodiment shown in FIG. 3.
Figure 5:
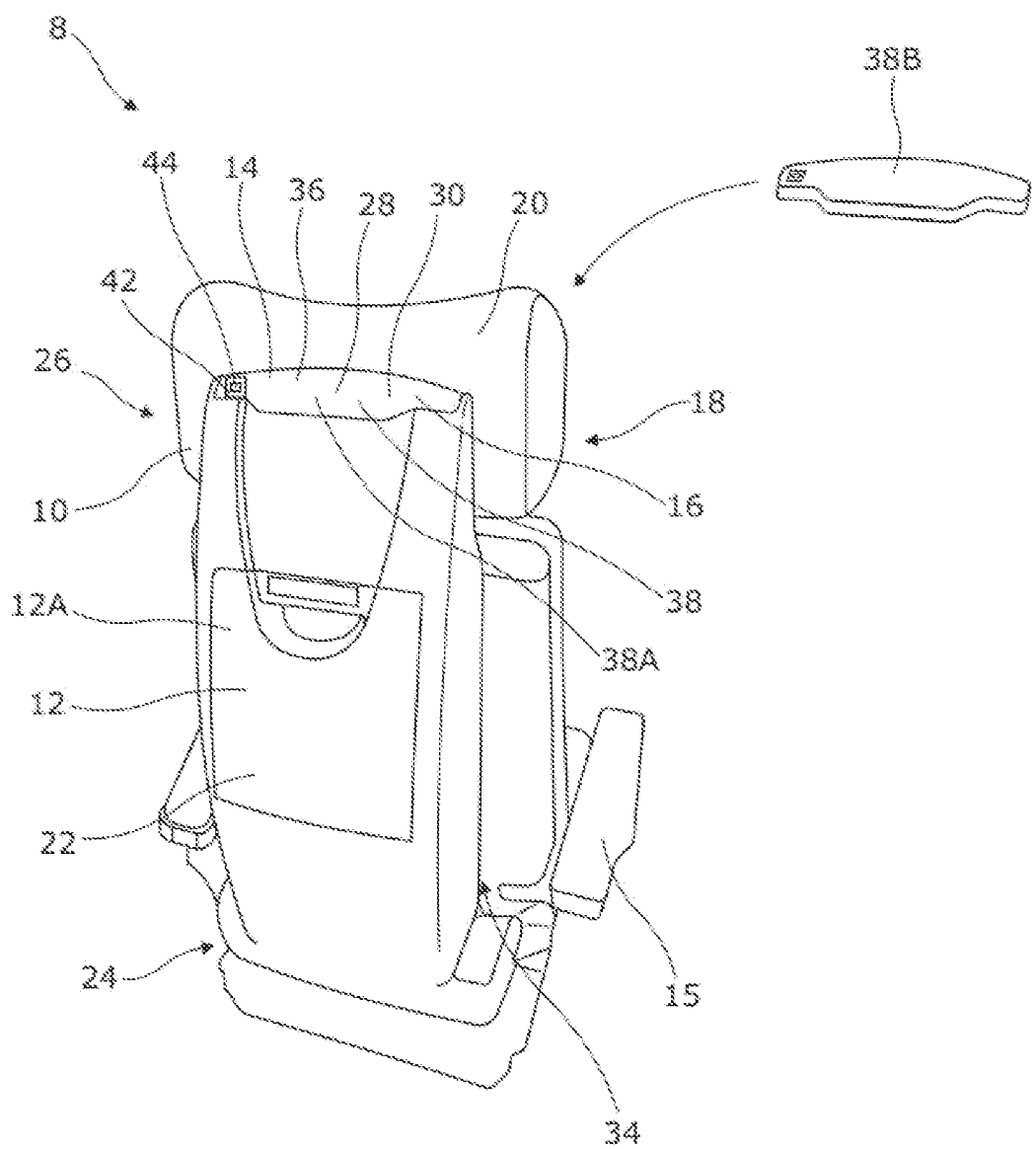
FIG. 5 is the same view as that shown in FIG. 4 but in which part of equipment allowing adjustment of the comfort parameters is removable.

According to the embodiment illustrated in FIGS. 4 and 5, the shell 22 has the outer rear face 12A that is visible on entering the cockpit and a face 34 opposite thereto. The shell 22 has an upper face 36 forming the connection between the rear face 12A and front face 34 of the shell and thus constituting the peripheral upper edge of the shell 22. The upper face 36 is inclined with respect to the horizontal so as to be visible to any person entering the cockpit 2. With the aircraft resting on the ground, a horizontal plane is considered to be a plane parallel to the ground. The equipment 14 is integrated into the shell 22 at the upper face 36, forming a unit therewith, namely at least part of the upper edge of the shell. According to an alternative embodiment, the equipment 14 could be integrated below the upper edge at a projection that makes it possible to offer an inclined face that is visible from the entrance of the cockpit. According to another embodiment illustrated in FIG. 5, the equipment 14 can take the form of an electronic device 38 comprising a part 38A secured to the seat back and an independent part 38B which is removable so as to form a unit with the shell when connected to the part 38A and so as to be readily disconnected therefrom by any type of known means. The part 38B comprises a processor 19 for processing data and a data storage zone 21. Thus, the device 38, and more precisely the removable part 38B, can be preprogramed on the ground before entering the aircraft, and when the pilot or any other person connects it, for example by clipping, to the shell, and more precisely to the part 38A, the comfort parameters are automatically adjusted to the preprogramed values. The device 38 is then used in the same way as integrated equipment 14. Any other embodiment of the equipment 14 can provide a fixed part 38A and a removable part 38B in the same way.

Figure 6:
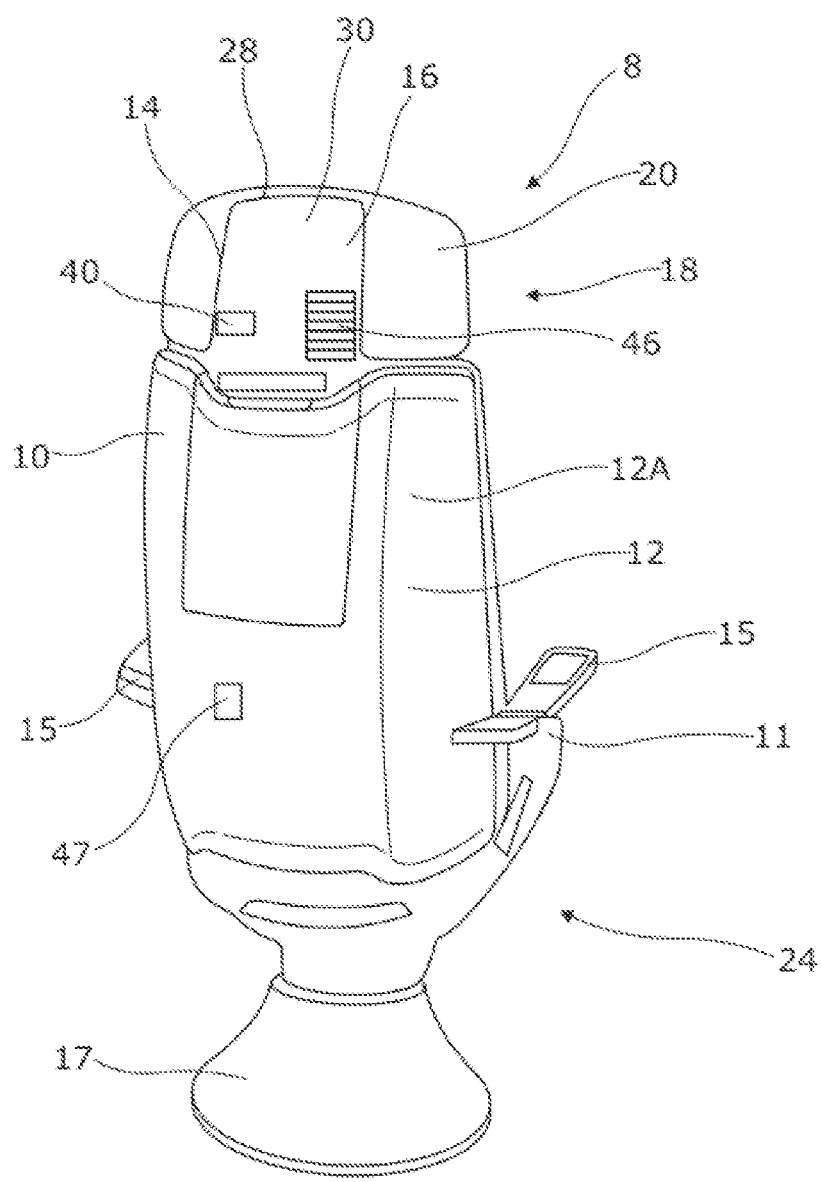
FIG. 6 is a perspective view of an embodiment other than that shown in FIGS. 3 to 5 of a seat seen from the rear according to the disclosure herein.

In the embodiment of FIG. 6, the equipment 14 is integrated into the headrest 20 at the rear face 12 of the seat back. The face 12 therefore includes the rear face of the headrest. The touchscreen 30 of the equipment 14 extends over more than half the height of the headrest or even over the total or virtually total height thereof. This makes it possible to have a large interaction surface for a more user-friendly display.

The equipment 14 is integrated into at least one of the seats 8A, 8B of the cockpit or even into all of them. Thus, there may be only single equipment 14 from which all the comfort parameters are adjustable or equipment 14 on the pilot's seat 8A and equipment 14 on the co-pilot's seat 8B from which it is possible to adjust the same parameters and optionally different parameters specific to the seat 8A, 8B on which the corresponding equipment 14A, 14B is respectively integrated, for example. Moreover, in test aircraft for example, there is an additional seat for the flight engineer to the rear of the two pilot's and co-pilot's seats. Since its function and position are different, it may be practical to allocate equipment 14 for each seat so that each member of the crew in the cockpit can independently adjust the comfort parameters relevant thereto.

In certain embodiments such as that shown in FIG. 6, the equipment 14 may comprise device 40 for recognizing the person manipulating it. The device of known type may be biometric sensors for recording a fingerprint and/or an iris and/or a face and/or a voice and/or any other physical characteristic. The recognition device may be used in multiple ways such as to initiate unlocking of the equipment or else to call comfort parameters corresponding to the profile of the identified user and to adjust the environment accordingly.

The possibility of adjusting comfort parameters at the back of the seat does not prevent additional comfort controls 28 from being arranged elsewhere. Thus, controls for adjusting the seat can also be provided on the armrest of the seat or on other zones thereof or even on a wall of the cockpit.

The equipment 14 is connected in a wired or wireless manner to a comfort parameter processing module itself connected to at least one adjustable component of the pilot's environment and/or directly (or indirectly) to at least one of the components. This aspect will not be described in more detail since the systems used for associating an adjustment of a component using a comfort control 28 are of known type.

The starting of the equipment 14 is controlled from a control 42 in the form, for example, of a button 44 on the edge of the screen. Alternatively, it can be ensured automatically by an event such as opening the entrance door in the cockpit or the recognition of a pilot, whether it be biometric recognition using a suitable sensor or facial recognition using cameras or the like before the pilot accesses the cockpit.

The person entering can adjust the comfort parameters manually or activate a personalized adjustment profile (for example automatically using recognition device 40 as explained above).

The equipment 14 can be programmed to display information upon entry of the pilot and/or co-pilot and/or one or more other members of the cockpit crew. The display zone 16 can display welcome visuals, information destined for the persons entering, such as weather forecasts, information on the aircraft or else important and specific information that the company wishes to display as a reminder for the pilot and/or other aforementioned person(s). This information may be identical throughout a fleet or else personalized and/or specific to the aircraft and/or to the persons entering. The equipment 14 can be provided with audio device 46 (FIG. 6), such as a loudspeaker for playing music or for welcoming the persons entering in a personalized and oral manner. The equipment 14 can illuminate the cockpit 2 in a certain way, for example by displaying on the display zone 16 specific shapes and/or colors such as colours of the company or of the manufacturer, drawings or images such as a logo, for example that of the company or manufacturer, and the name and/or the photo of the person entering (pilot, co-pilot, etc.). This can be a combination of some of these elements and/or others that have not been mentioned, or all of them. In the case of a night flight, the elements displayed by the equipment 14 can provide temporary, complementary or alternative lighting. The recognition device 40 described above make it possible to identify the person manipulating the equipment and to choose programming of actions as described above (lighting, information display, etc.). The recognition of the person entering as seen above can also trigger unlocking of the equipment 14. Depending on the native language of the thus identified person entering, the information is broadcast in a suitable language.

The shape of the equipment 14 is adapted to the contours of the seat so as not to lose any space and to maintain or even improve the appearance thereof.

Part of the surface of the seat 8 may be covered with a photoelectric device of known type in order to power the equipment 14, a photoelectric cell 47 of which is shown in FIG. 6 for the purpose of simplification.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cockpit seat comprising a seat back comprising:
a rear face;
a cushion; and
equipment comprising:
a first part comprising at least one comfort parameter control, a display zone, and a touchscreen within the display zone, wherein the first part is secured to the cockpit seat on the rear face of the seat back; and
a removable part, which is removably attached to the first part and comprises at least a processor for processing data and at least one data storage zone, wherein the removable part is pre-programable with values for comfort parameters associated with a user before the user enters an aircraft where the cockpit seat is located;
wherein, when the removable part is connected to the first part on the cockpit seat, the comfort parameters are automatically adjusted to values for the comfort parameters that are preprogramed into the removable part.

2. The cockpit seat according to claim 1, wherein the comfort parameters comprise one or more of a position of the seat, a position of a portion of the seat, lighting in a cockpit where the cockpit seat is located, display of information associated with piloting, and a temperature in the cockpit.

3. The cockpit seat according to claim 1, wherein:
the seat back comprises a headrest; and
the equipment is integrated into the headrest, at least in part; or
wherein the at least one comfort parameter control is actuated by pressing on the touchscreen.

4. The cockpit seat according to claim 1, wherein:
the seat back comprises a shell;
the rear face of the seat back corresponds to a rear face of the shell; and
the equipment is integrated into an upper part of the shell, on a face of the shell that is inclined with respect to horizontal.

5. An aircraft cockpit comprising:
the cockpit seat according to claim 1; and
an instrument panel having piloting controls, which are physically segregated from the equipment of the cockpit seat, such that the instrument panel is on an opposite side of the cockpit seat from the equipment of the cockpit seat.

6. A method for controlling comfort parameters of a cockpit, the method comprising:
providing equipment comprising:
a first part comprising at least one comfort parameter control, a display zone, and a touchscreen within the display zone; and
a removable part comprising at least a processor for processing data and at least one data storage zone;
securing the first part of the equipment to a rear face of a seat back of at least one seat of the cockpit
attaching the removable part to the first part in a manner that allows for detachment of the removable part from the first part by a user during normal operation of an aircraft comprising the cockpit;
using the at least one comfort parameter control of the equipment to control the comfort parameters of the cockpit;
pre-programing the removable part with values for comfort parameters associated with the user before the user enters the cockpit; and
when the removable part is connected to the first part on the cockpit seat, automatically adjusting values to the comfort parameters that are preprogramed into the removable part.

7. The method according to claim 6, comprising controlling the display zone to provide temporary, alternative, or complementary lighting of the cockpit.

8. The method according to claim 6, wherein;
certain comfort controls are accessible from the equipment and also at a distance therefrom, in the cockpit outside an instrument panel; or
the equipment activates comfort controls associated with control parameters determined according to the user identified by recognition by the equipment.

9. The method according to claim 6, wherein the comfort parameters comprise one or more of a position of the seat, a position of a portion of the seat, lighting in a cockpit where the cockpit seat is located, display of information associated with piloting, and a temperature in the cockpit.

10. A cockpit seat comprising:
a seat back comprising:
a rear face;
a cushion; and
equipment comprising:
at least one comfort parameter control, a display zone, and a touchscreen, all of which are attached to the cockpit seat on the rear face of the seat back; and
a removable part, which comprises at least some controls, a processor, and at least one data storage zone;
wherein the at least one comfort parameter control is actuated by pressing on the touchscreen;
a shell;
wherein the rear face of the seat back corresponds to a rear face of the shell; and
wherein the equipment is integrated into an upper part of the shell, on a face of the shell that is inclined with respect to horizontal.

* * * * *